US011848847B1

(12) United States Patent
Guo et al.

(10) Patent No.: US 11,848,847 B1
(45) Date of Patent: Dec. 19, 2023

(54) BALANCED OPTIMIZATION WITHIN A BROKER CLUSTER

(71) Applicant: International Business Machines Corporation, Armonk, NY (US)

(72) Inventors: Jun Guo, Xian (CN); Yong Wang, Xian (CN); Deng Xin Luo, Xian (CN); Xiang Yu Yang, Xian (CN); Jia Wei He, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/963,340

(22) Filed: Oct. 11, 2022

(51) Int. Cl.
*H04L 67/1001* (2022.01)
*H04L 43/0876* (2022.01)

(52) U.S. Cl.
CPC .... *H04L 43/0876* (2013.01); *H04L 67/10015* (2022.05)

(58) Field of Classification Search
CPC ....................... H04L 43/0876; H04L 67/10015
See application file for complete search history.

(56) References Cited

U.S. PATENT DOCUMENTS

| 11,269,752 | B1* | 3/2022 | Bharadwaj | G06F 11/3006 |
| 2018/0091588 | A1* | 3/2018 | Qin | H04L 67/1095 |
| 2018/0316749 | A1* | 11/2018 | Sah | H04L 43/16 |
| 2019/0188562 | A1* | 6/2019 | Edwards | G06N 5/045 |
| 2019/0386889 | A1* | 12/2019 | Noorshams | H04L 67/10 |
| 2021/0135966 | A1* | 5/2021 | Dinh | H04L 41/149 |

FOREIGN PATENT DOCUMENTS

| CN | 112099451 B | 1/2022 | |
| EP | 3893064 A1 * | 10/2021 | ........... G06N 3/0454 |

OTHER PUBLICATIONS

Arun, Re-balance your Kafka Cluster, published in Hashedin, Feb. 22, 2020.
Unknown, Cluster Manager, published in Kafka.utils, https://kafka-utils.readthedocs.io/en/latest/index.html, last downloaded on Jun. 28, 2022.
Unknown, Kafka Broker Health Tests, published in Cloudera, https://docs.cloudera.com/documentation/enterprise/6/6.3/topics/cm_ht_kafka_broker.html, last downloaded on Jun. 28, 2022.
Unknown, Kafka cluster smooth expansion and Leader balance, published in Katastros, https://blog.katastros.com/a?ID=77826679-ec04-4ecc-bd72-5d8f3c4b8889, last downloaded on Jun. 28, 2022.

* cited by examiner

*Primary Examiner* — Mohamed A. Wasel
*Assistant Examiner* — Kidest Mendaye

(57) ABSTRACT

An example operation may include one or more of monitoring a plurality of brokers within a cluster to identify current workload attributes of the plurality of brokers, determining a health value of a lead broker within the cluster via execution of a machine learning model on current workload attributes of the lead broker, determining to modify resources assigned to the lead broker based on the determined health value of the lead broker, executing an optimization algorithm on the current workload attributes of the plurality of brokers within the cluster to determine an optimum task distribution, and reallocating tasks amongst the lead broker and the one or more other brokers within the cluster based on the optimum task distribution.

16 Claims, 15 Drawing Sheets

210

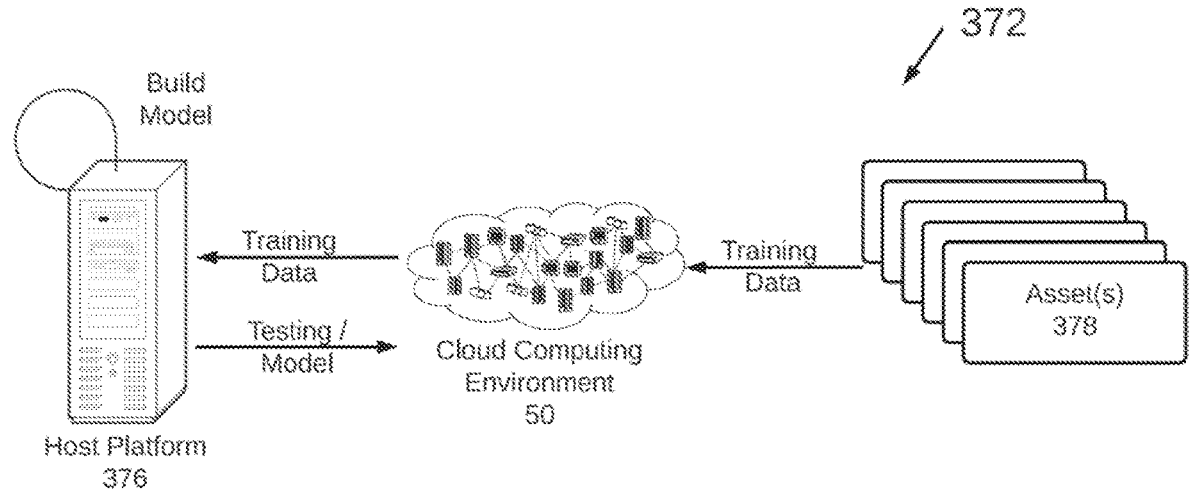
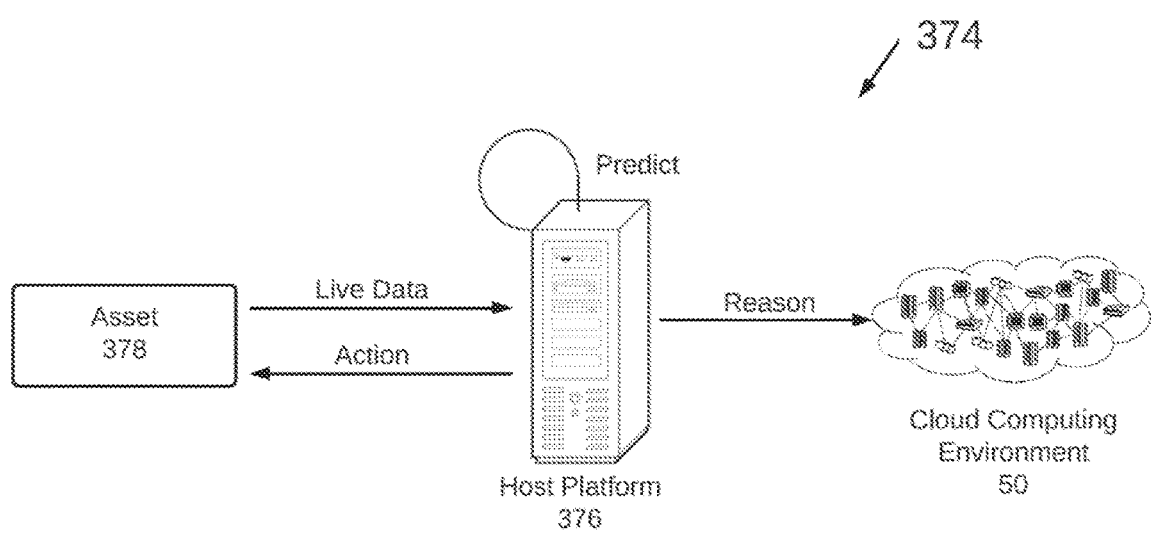
FIG. 3D

| Data Size | MIR | MOR | Fetch Rate | CPU Load | Disk Usage | Mem Usage | Connects |
|---|---|---|---|---|---|---|---|
| 9899 (bytes) | 10000 (ct) | 7843 (ct) | 887 ms | 84% | 44% | 65% | 44574 |
| 234 (bytes) | 3402 (ct) | 6456 (ct) | 650 ms | 23% | 33% | 37% | 3456 |
| 77 (bytes) | 432 (ct) | 42 (ct) | 663 ms | 46% | 54% | 87% | 32 |

450

Multi-Object Optimization Model 460

Optimization Plan 462

| | |
|---|---|
| Broker 1 | Partition ID(s) |
| Broker 2 | Partition ID(s) |
| Broker 3 | Partition ID(s) |

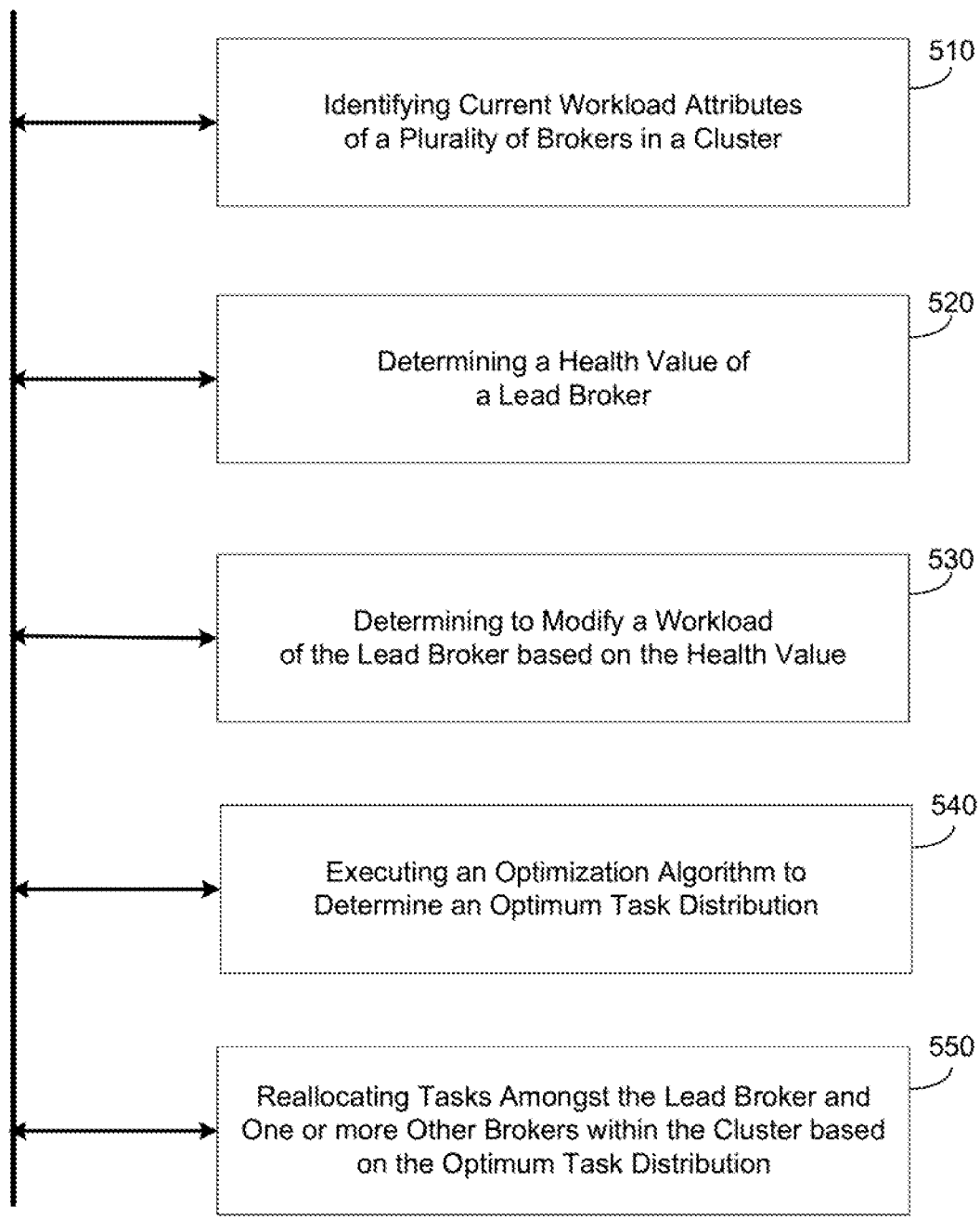

BALANCED OPTIMIZATION WITHIN A BROKER CLUSTER

BACKGROUND

In a complex computer software platform such as a KAFKA® distributed event streaming platform, a broker may refer to a server, a virtual machine, or the like. Each partition within the platform may correspond to a topic or a plurality of topics and each partition may be managed by a cluster of brokers. In particular, one broker may perform the role of leader for a partition while one or more other brokers within the cluster may perform the role of follower broker. The leader broker is typically responsible for all read/write requests to the partition while the followers passively replicate the role of a leader. As a result of this configuration, the workloads amongst the different brokers within a cluster can become uneven especially when the cluster is responsible for multiple partitions in a complex productive environment.

SUMMARY

One example embodiment provides an apparatus that includes a processor configured to monitor a plurality of brokers within a cluster to identify current workload attributes of the plurality of brokers, and a storage configured to one or more of store the current workload attributes. The processor may also determine a health value of a lead broker within the cluster via execution of a machine learning model on current workload attributes of the lead broker, determine to modify resources assigned to the lead broker based on the determined health value of the lead broker, execute an optimization algorithm on the current workload attributes of the plurality of brokers within the cluster to determine an optimum task distribution, and reallocate tasks amongst the lead broker and the one or more other brokers within the cluster based on the optimum task distribution.

Another example embodiment provides a method that includes one or more of monitoring a plurality of brokers within a cluster to identify current workload attributes of the plurality of brokers, determining a health value of a lead broker within the cluster via execution of a machine learning model on current workload attributes of the lead broker, determining to modify resources assigned to the lead broker based on the determined health value of the lead broker, executing an optimization algorithm on the current workload attributes of the plurality of brokers within the cluster to determine an optimum task distribution, and reallocating tasks amongst the lead broker and the one or more other brokers within the cluster based on the optimum task distribution.

A further example embodiment provides a computer-readable medium comprising instructions, that when read by a processor, cause the processor to perform one or more of monitoring a plurality of brokers within a cluster to identify current workload attributes of the plurality of brokers, determining a health value of a lead broker within the cluster via execution of a machine learning model on current workload attributes of the lead broker, determining to modify resources assigned to the lead broker based on the determined health value of the lead broker, executing an optimization algorithm on the current workload attributes of the plurality of brokers within the cluster to determine an optimum task distribution, and reallocating tasks amongst the lead broker and the one or more other brokers within the cluster based on the optimum task distribution.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3D is a diagram illustrating machine learning process via a cloud computing platform according to an example embodiment.

FIG. 5 is a diagram illustrating a method of balancing a workload amongst brokers within a cluster according to an example embodiment.

DETAILED DESCRIPTION

Figure 1A:
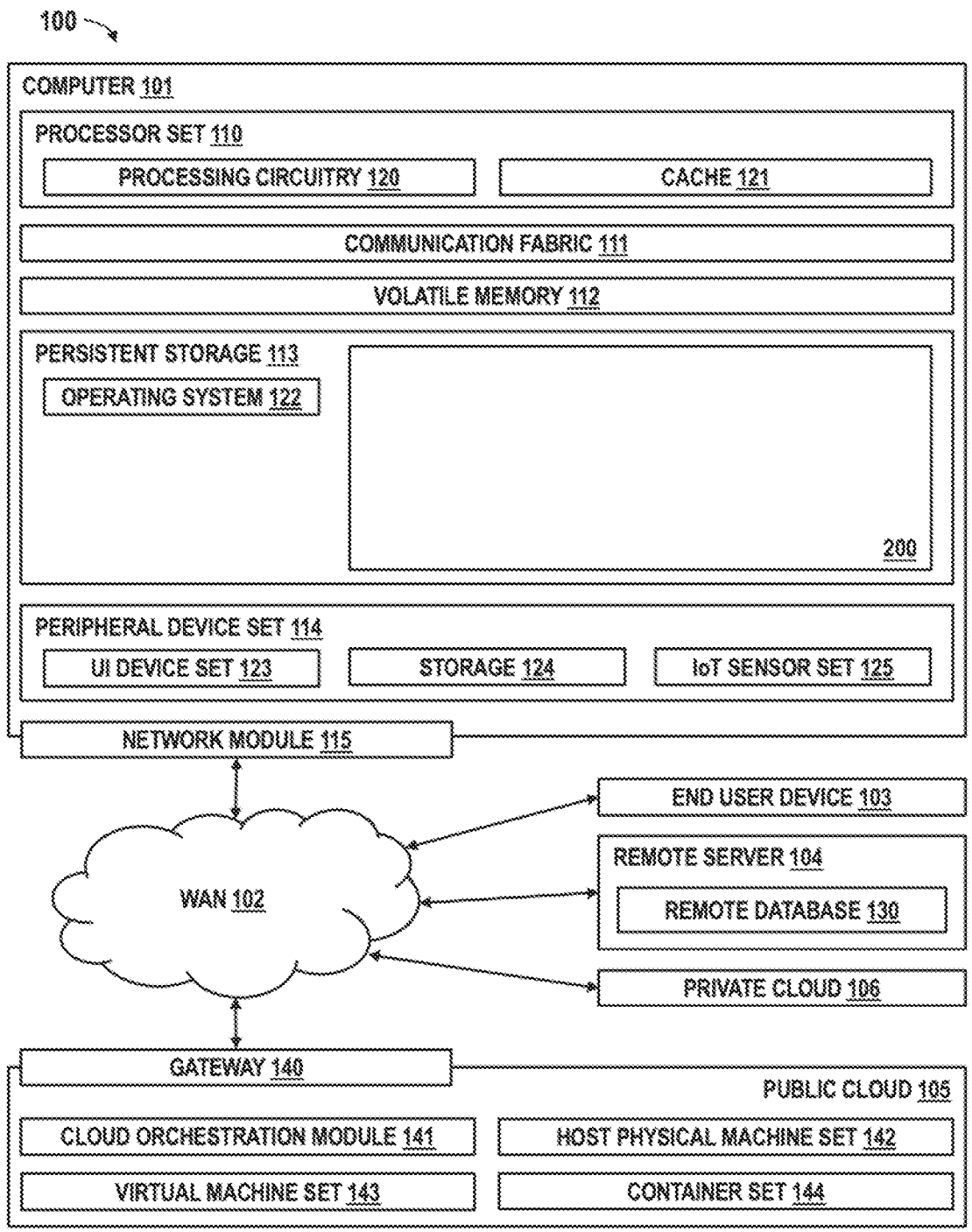
FIG. 1A is a diagram illustrating a computing environment according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

In a KAFKA platform, each partition of data (topic) may be managed by a plurality of brokers which are referred to herein as a cluster of brokers. Current balancing techniques for KAFKA lead brokers is to replace the leader broker with a predefined "preferred" following broker within the cluster. The replacement though is not based on the current workload of the brokers within the cluster, nor does it consider a health of the current lead broker. As a result, the load amongst brokers within a cluster is typically unbalanced.

The example embodiments are directed to a leader balancing process for brokers within a common cluster in which real-time load attributes of the brokers are used to generate a balanced load amongst the brokers. For example, the process may identify a current health of each broker within the cluster using a machine learning model such as a classification model or a regression model that is trained using historical data from the brokers (or other brokers).

The machine learning model can be trained to learn key parameters (workload attributes) that are more important (height weight) for broker health within the cluster. The machine learning model can receive current/real-time workload attributes of a broker and determine whether the broker is unhealthy (e.g., below a predefined threshold value, etc.) If the broker is determined to be unhealthy, it can trigger a load balancing process. Furthermore, the health values can be used to optimize the load amongst the brokers in the cluster.

When an unhealthy broker or cluster of brokers is detected, the host system can derive an optimization plan for balancing the load amongst the brokers using a multi-objective optimization algorithm that considers different workload attributes when generating a balancing recommendation. The output of the optimization may be a plan, referred to herein as a leader optimization plan or task optimization plan which identifies which brokers should lead which partitions in order to ensure a more balanced load amongst all brokers in the cluster.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1A, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the inventive methods, such as optimal broker balancing as shown in block 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 1B:
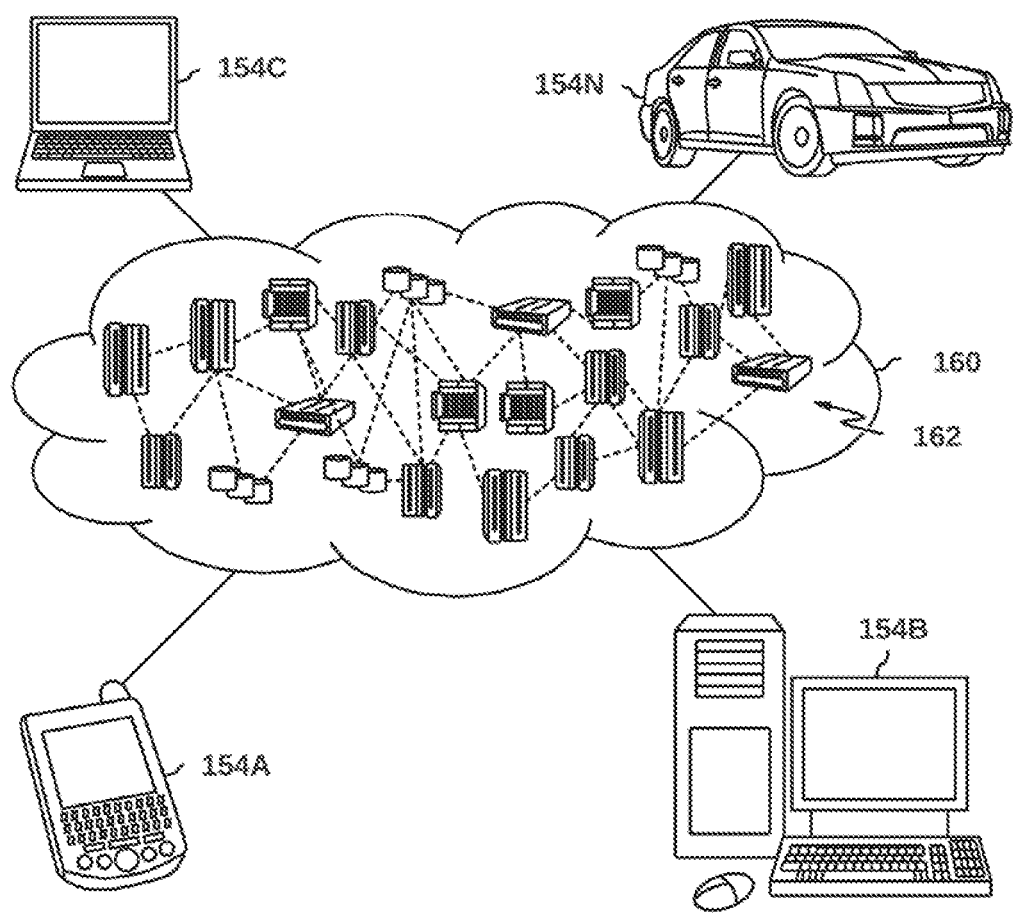
FIG. 1B is a diagram illustrating a cloud computing environment according to an example embodiment

Referring now to FIG. 1B, an illustrative cloud environment 150 is depicted. As shown, cloud computing environment 160 includes one or more cloud computing nodes 162 with which local computing devices used by cloud consumers, such as, for example, personal digital assistant (PDA) or cellular telephone 154A, desktop computer 154B, laptop computer 154C, and/or automobile computer system 154N may communicate. Nodes 162 may communicate with one another. They may be grouped (not shown) physically or virtually in one or more networks, such as Private, Community, Public, or Hybrid clouds as described hereinabove, or a combination thereof. This allows cloud computing environment 160 to offer infrastructure, platforms and/or software as services for which a cloud consumer does not need to maintain resources on a local computing device. It is understood that the types of computing devices 154A-N shown in FIG. 1B are intended to be illustrative only and that computing nodes 162 and cloud computing environment 160 can communicate with any type of computerized device over any type of network and/or network addressable connection (e.g., using a web browser).

Figure 2A:
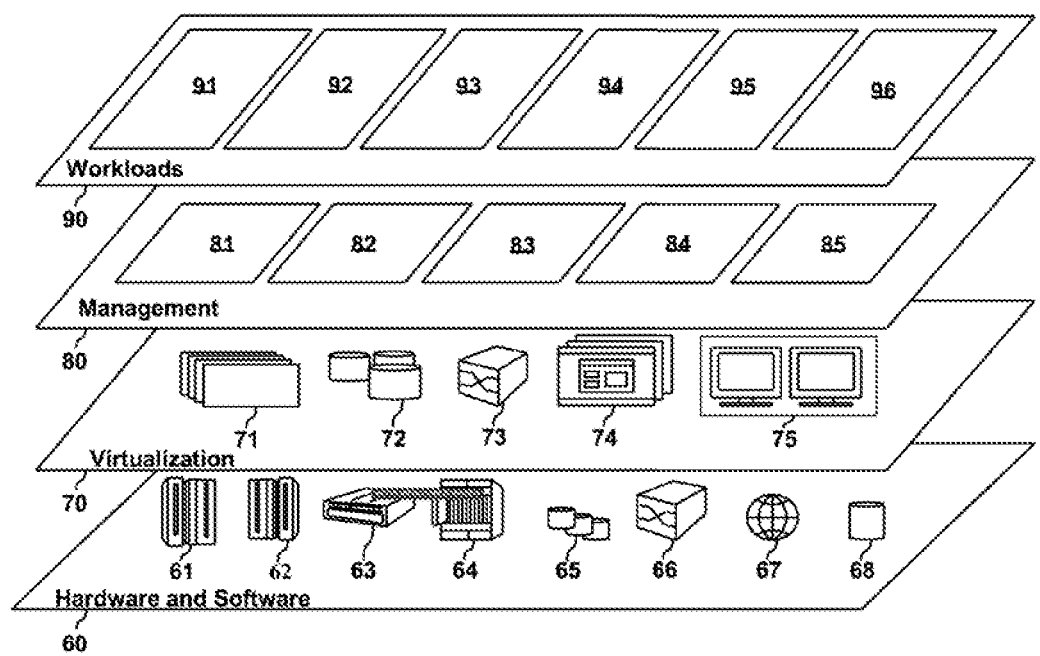
FIG. 2A is a diagram illustrating abstraction model layers of a cloud computing environment according to an example embodiment.

Referring now to FIG. 2A, a set of functional abstraction layers provided by cloud computing environment 50 FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and load balancing processing 96.

Figure 2B:
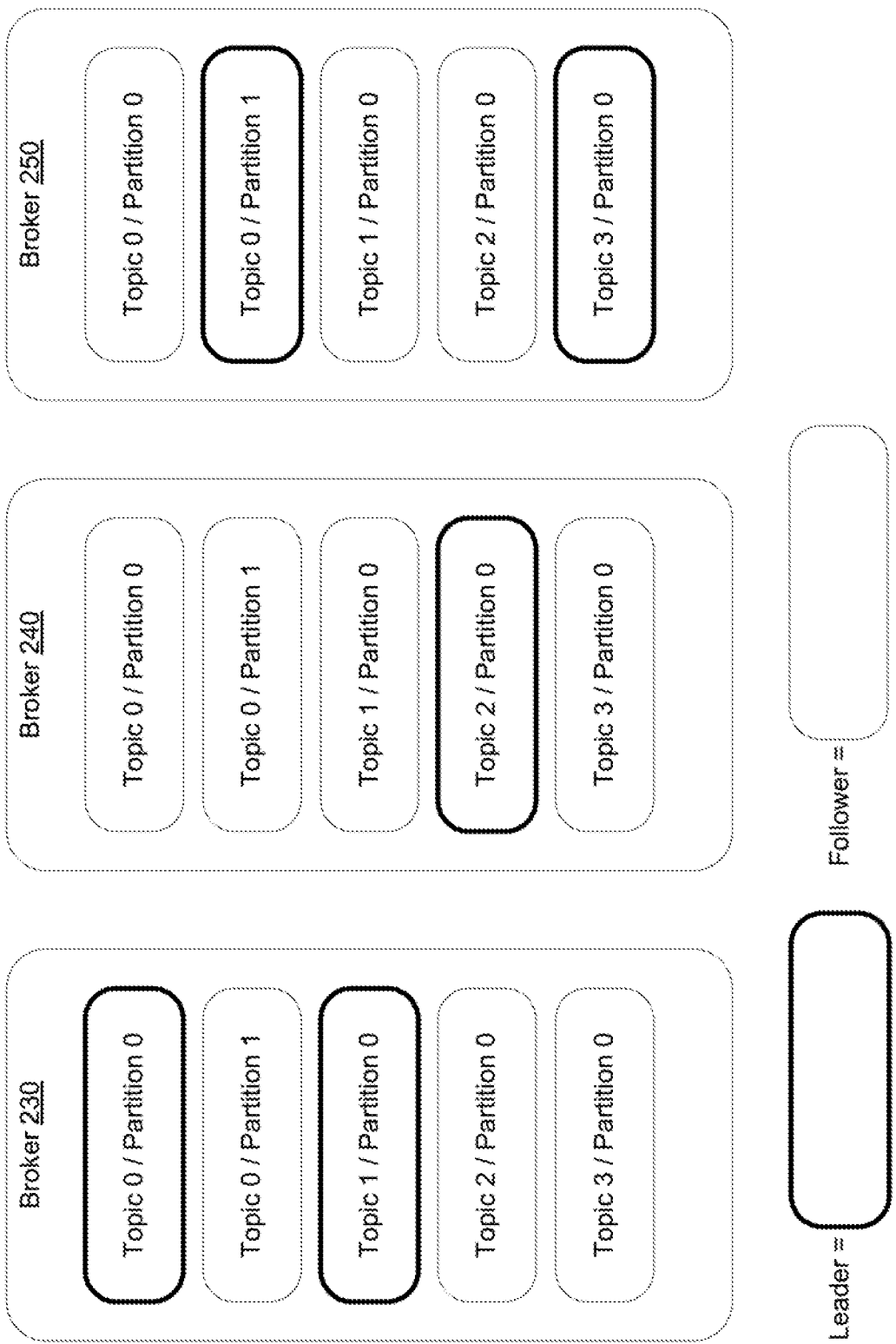
FIGS. 2B-2C are diagrams illustrating a system for balancing a workload amongst brokers within a cluster according to an example embodiment.
Figure 2C:
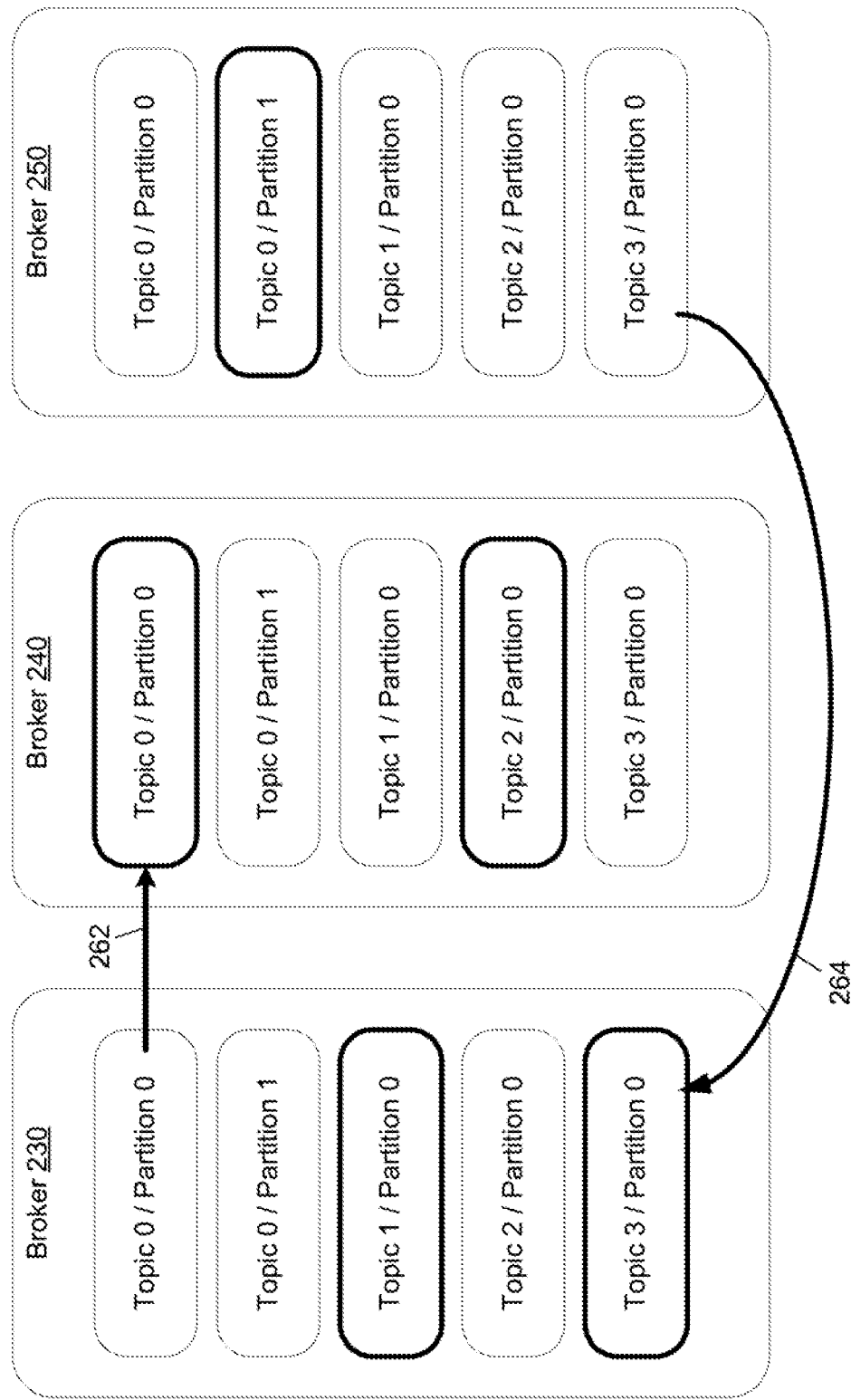

FIGS. 2B and 2C illustrate a system for balancing a load among a cluster of brokers in a host platform according to an example embodiment. For example, the process may be performed by the load balancing processing 96 shown in FIG. 2A. Referring to FIG. 2B, a system 220 includes a cluster of brokers including broker 230, broker 240, and broker 250. The cluster of brokers is responsible for managing read/write operations of four topics (i.e., topic 0, topic 1, topic 2, and topic 3) stored on two partitions of a host platform (i.e. partition 0, partition 1, etc.)

As shown in FIG. 2B, in this example, the broker 230 is currently a leader broker for topic 0 on partition 0 and topic 1 on partition 1, the broker 240 is currently a leader broker for topic 2 on partition 0, and the broker 250 is the leader broker for topic 0 on partition 1 and topic 3 on partition 0. For each leader broker, the partition/topics also include follower brokers. For example, the broker 230 is currently the leader broker of topic 0 on partition 0 and topic 1 on partition 1, while the broker 240 and the broker 250 are follower brokers for topic 0 on partition 0 and topic 1 on partition 1. The leader broker is responsible for read/write operations to the partition/topic while the follower brokers are replicas of the leader broker and are ready in case of a need to switch over roles.

According to various embodiments, the roles of the brokers can be modified to ensure a more balanced load amongst the brokers 230, 240, and 250. For example, the host platform may monitor the brokers performance and train a machine learning model to identify whether a broker is unhealthy based on such monitored performance. The host platform may use the machine learning model to output an indicator of the broker health. This machine learning model can be used by the host platform to detect a leader broker that needs load balancing.

To generate the machine learning model, the host platform may perform data processing on monitored historical workload data from the cluster which may be obtained from logs, notes, metrics, and the like. The host may omit outlier values from the historical data prior to training the model. During model training, the input data may be encoded (e.g., via one-hot encoding) to convert the workload data into a format (e.g., a numerical format) that can be processed by a processing device and compatible with a machine learning model such as a classification model or a regression model.

The host platform may rely on a formula to present the workload (WL) of each leader, and there are multiple weights (w_k) to calculate. In this method, the host platform may use historical monitored data of the brokers 230, 240, and 250, and use machine learning methods, for example classifier or regression algorithms, to get the importance value of each attributes. The bigger the weights are, the more important they are for the model and the greater weight they will be given as a result of the training process. Below is an example of a health algorithm for calculating broker health.

$$WL_{ij} = \sum_{k=0}^{n} w_k * Attr_k. \qquad \text{Equation 1}$$

$n < Num_{attributes}, i \in [1, Num_{broker}], j \in [1, Num_{leaders}]$ $$WL_{ij} = \sum_{k=0}^{n} w_k * Attr_k. \qquad \text{Equation 2}$$

$n < Num_{attributes}, i \in [1, Num_{broker}], j \in [1, Num_{leaders}]$

In the two equations above, the variables have the following definitions:
$WL_{ij}$=the workload value of each leader in certain broker
$W_k$=the weight of each attribute
$Attr_k$=the attribute value
n=the number of filtered attributes The health formula can be used to identify which leader brokers are unhealthy and need load balancing. For example, the output of the machine learning model may be a numerical value (e.g., between 0 and 1.0, etc.) A threshold may be set, for example, a threshold of 0.5 may be set to identify whether a broker is healthy or unhealthy. For example, if the machine learning model outputs a health value of 0.5 or above for a broker, the broker may be considered healthy while a broker with a health value below 0.5 may be considered unhealthy. These numbers are just examples and so are the formulas. When an unhealthy leader is detected among the brokers, all brokers on that partition may be added to a list and used for determining an optimized task distribution (e.g., leader roles, follower roles, etc.) among the brokers within the cluster.

There is no requirement that a particular type of machine learning algorithm or model be used. Rather, the types of models and the types of workload attributes that become key performance indicators may differ by cluster, by partition, etc. Therefore, the model can be trained to identify which particular attributes for that cluster are the more important attributes and weight those higher when generating a predicted output value (health value). Workload attributes may include any attributes that identify how much work the broker has such as CPU usage ratio, memory usage ratio, read-in ratio, read-out ratio, links, and the like.

To generate the optimized task distribution plan the host platform may collect metrics data from a Kafka cluster which is generated by brokers within the cluster, and uses this information as input to a multiple-objective optimization algorithm which receives the input and generates an output which includes the optimized task distribution plan.

FIGS. 3A-3E provide various examples of additional features that may be used in association with the cloud computing environment described herein. These examples should be considered as additional extensions or additional examples of the embodiments described herein.

Figure 3A:
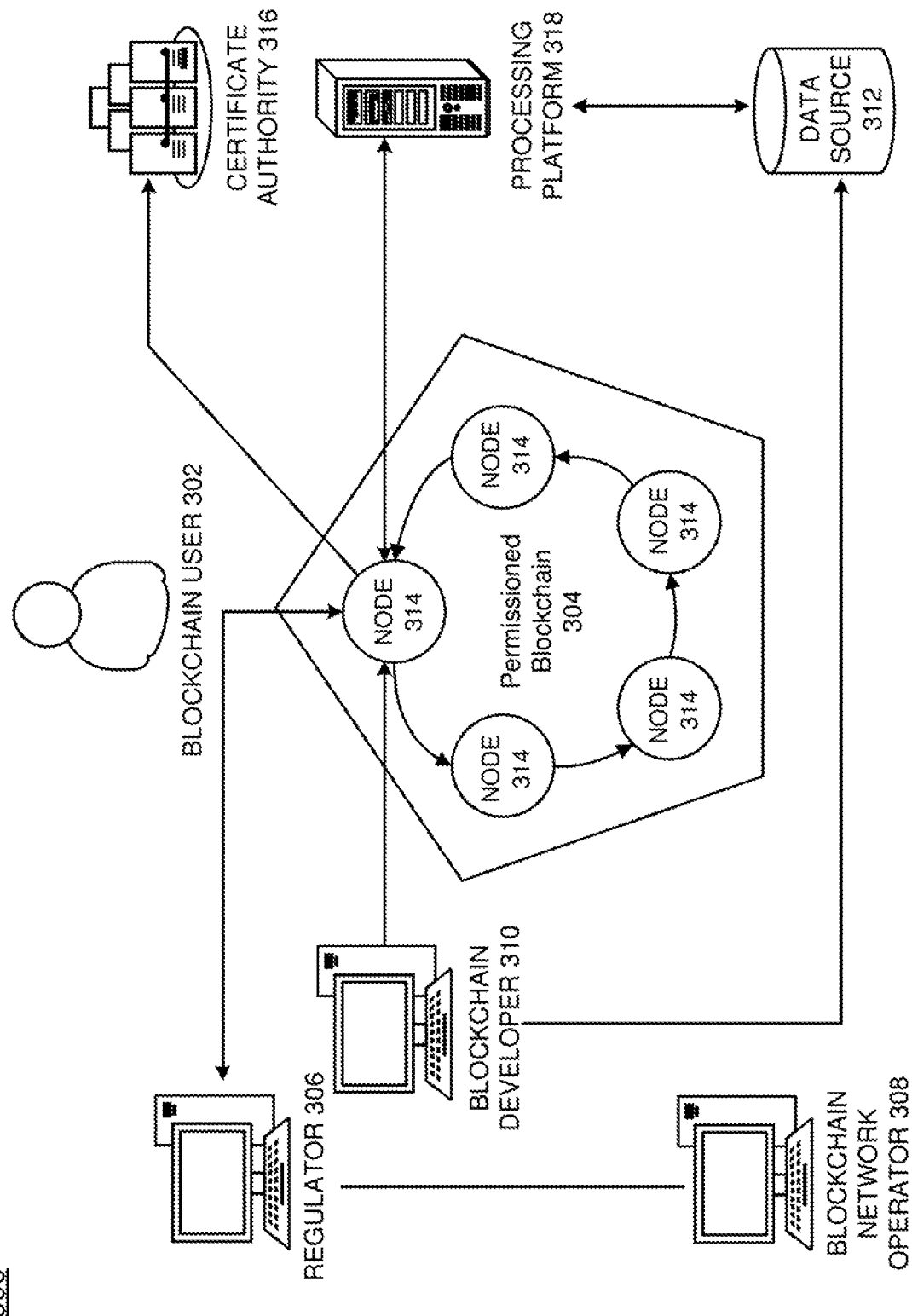
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
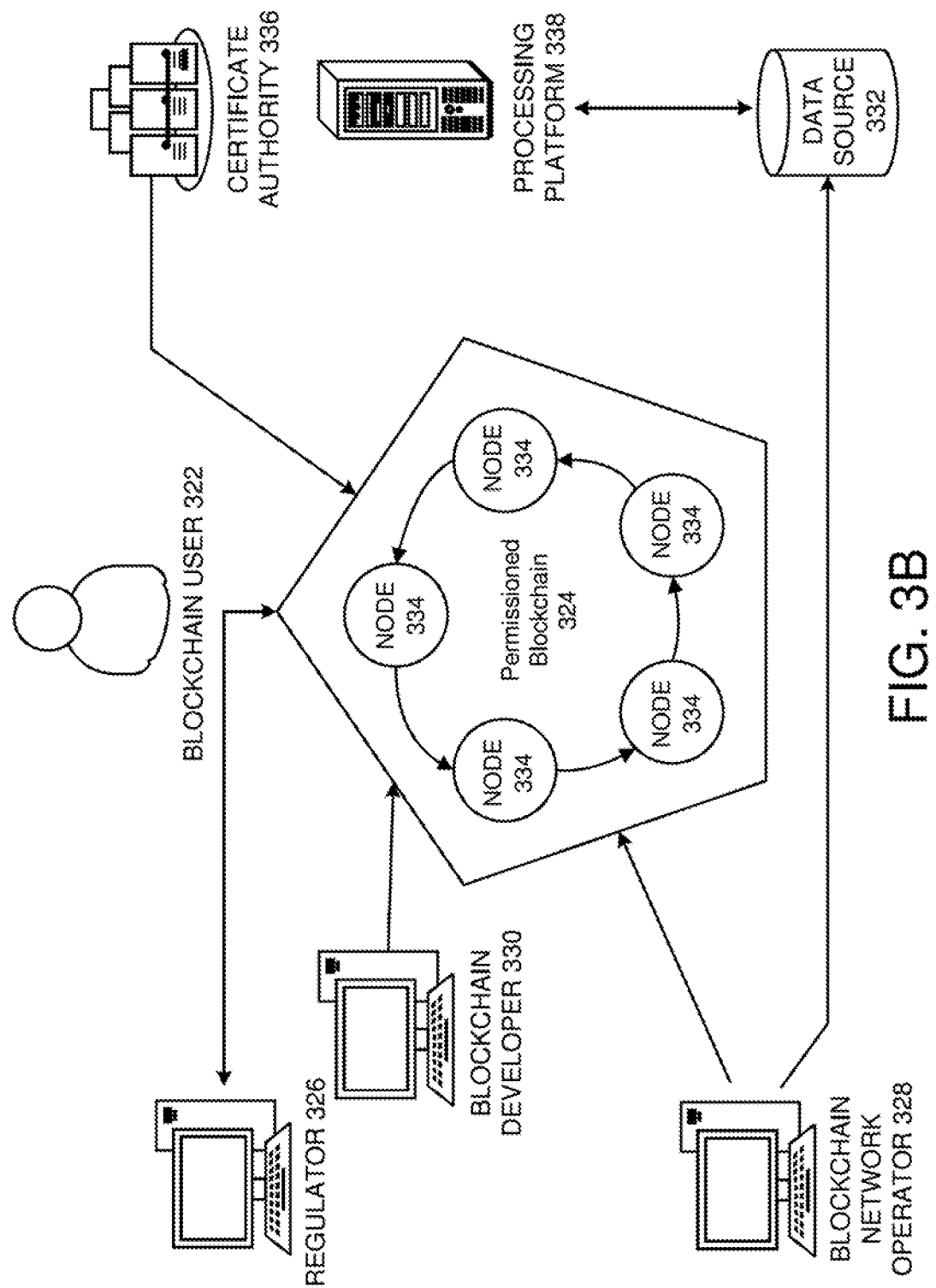

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
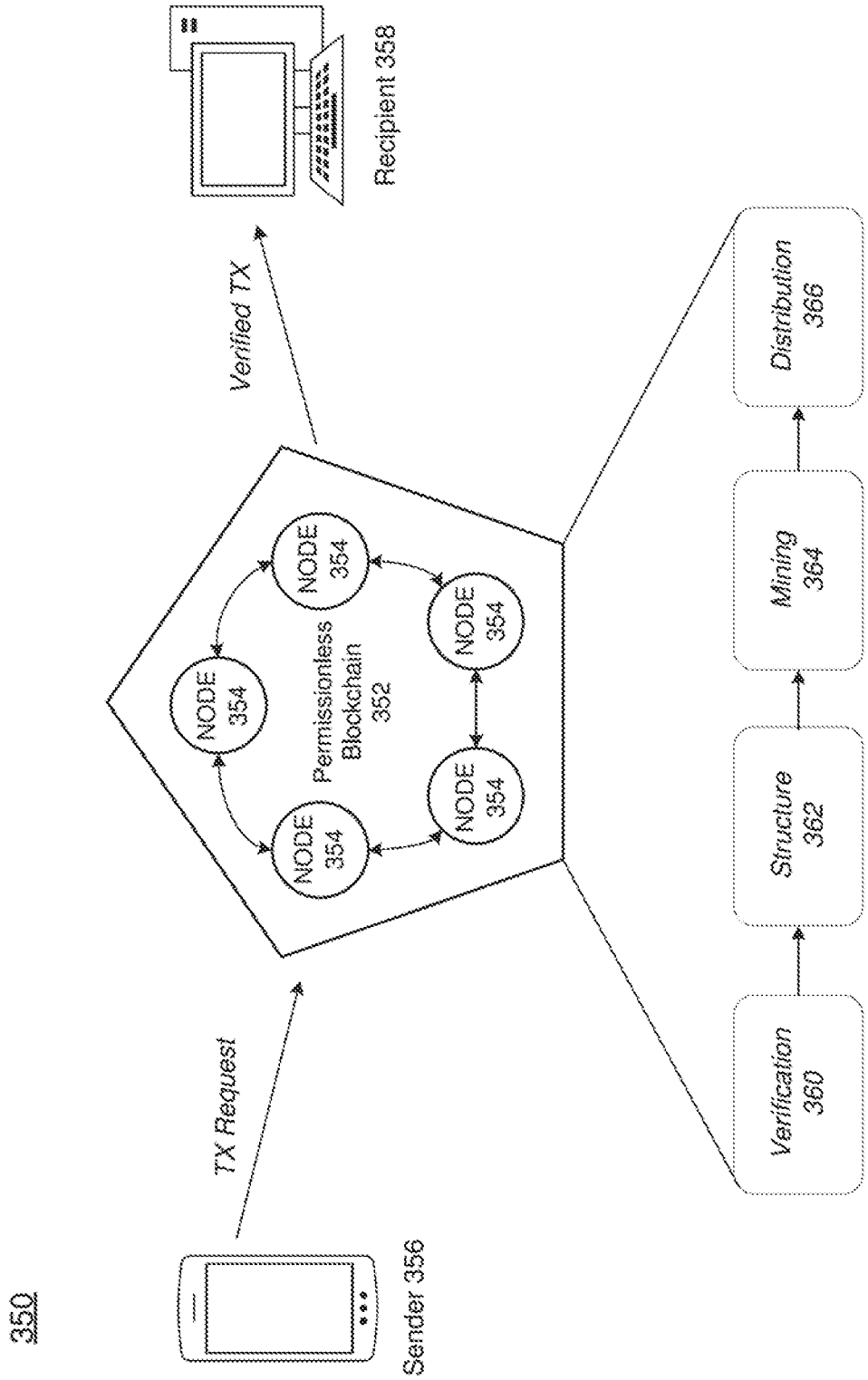

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3E:
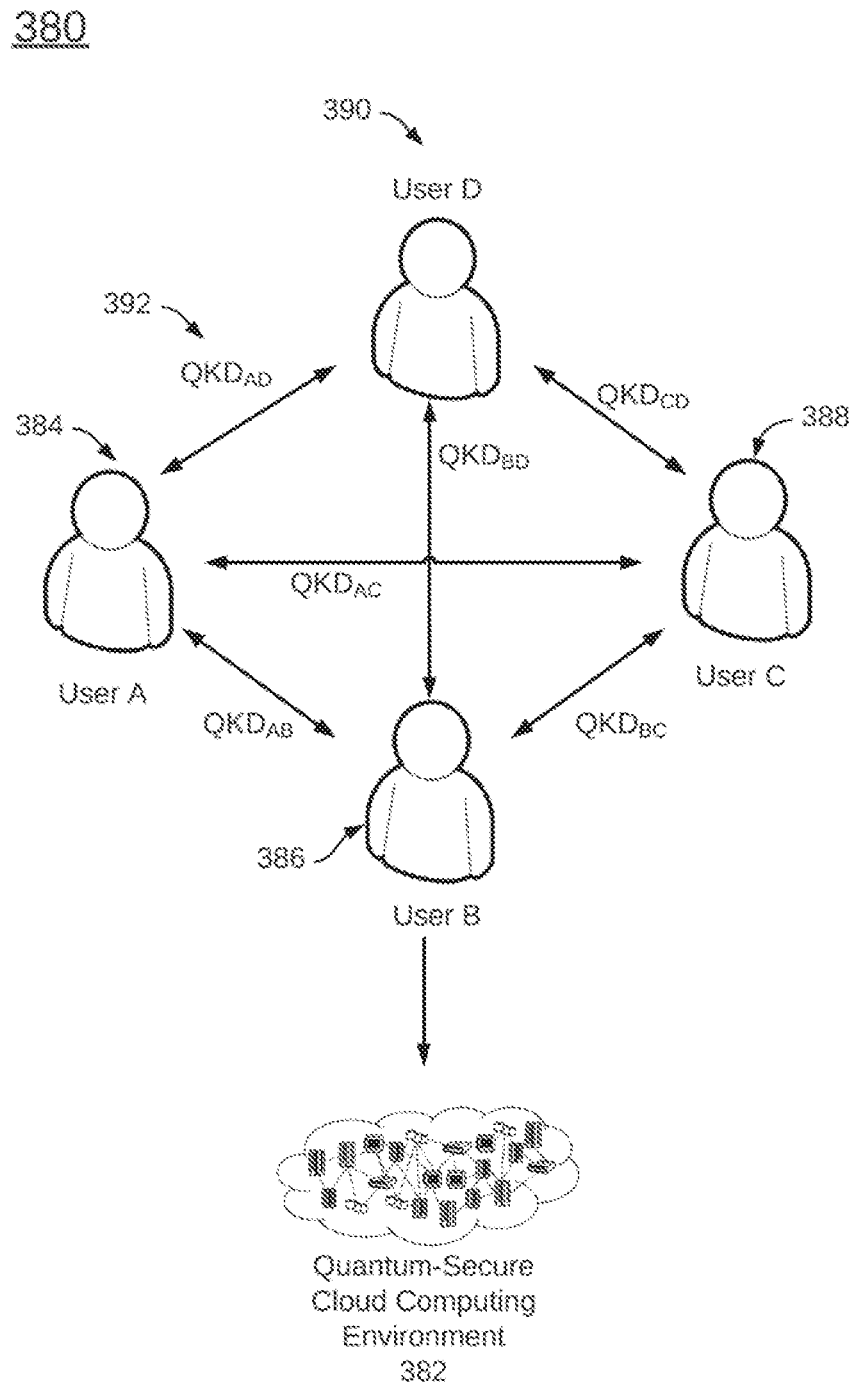
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

In the example embodiments, the host platform may be a cloud platform or other distributed computing environment which uses a KAFKA® software program to provide brokers for data partitions. The solution described herein can identify an unhealthy leader broker within a cluster and change the workload among the leader broker and other brokers in the cluster to create a more balanced load on each of the brokers within the cluster.

Figure 4A:
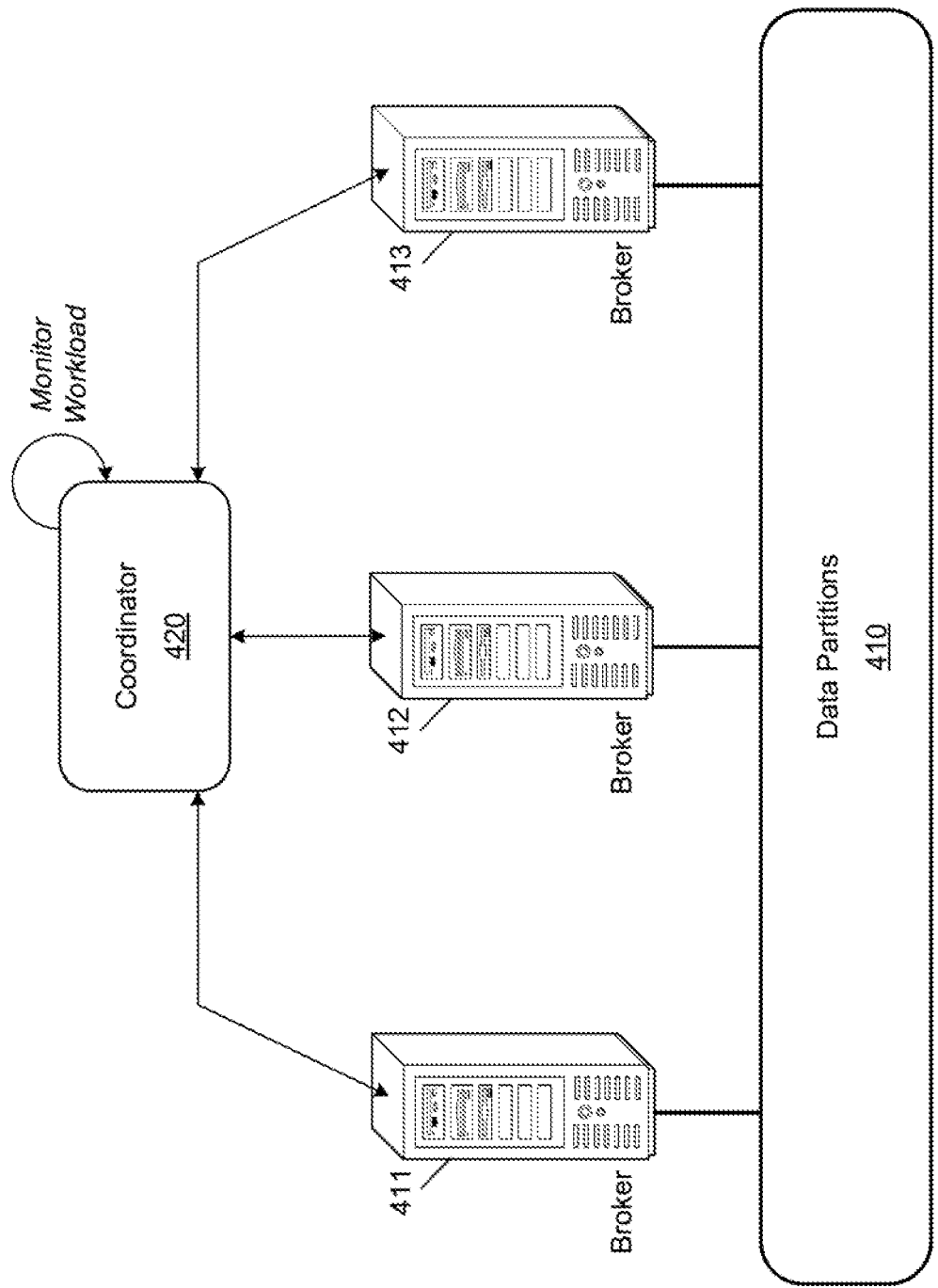
FIG. 4A is a diagram illustrating a process of monitoring a cluster of brokers for workload attributes according to example embodiments.

FIG. 4A illustrates a process 400 of a coordinator 420 monitoring a cluster of brokers for workload attributes according to example embodiments. Referring to FIG. 4A, a data partition 410 of a host platform (e.g., a KAFKA® platform, etc.) is managed by four brokers including a broker 411, a broker 412, a broker 413, and a broker 414. Each of the brokers may be a leader broker for different topics on the partition 410. For any topic which a broker is not a leader, that broker may perform the role of a follower broker that runs a replicate of the leader broker and is ready in case of a need to switch over to a new leader broker. However, the follower brokers still perform communications on the network and read/write data to the partition 410 and can also be monitored for their performance/workload attributes.

Figure 4B:
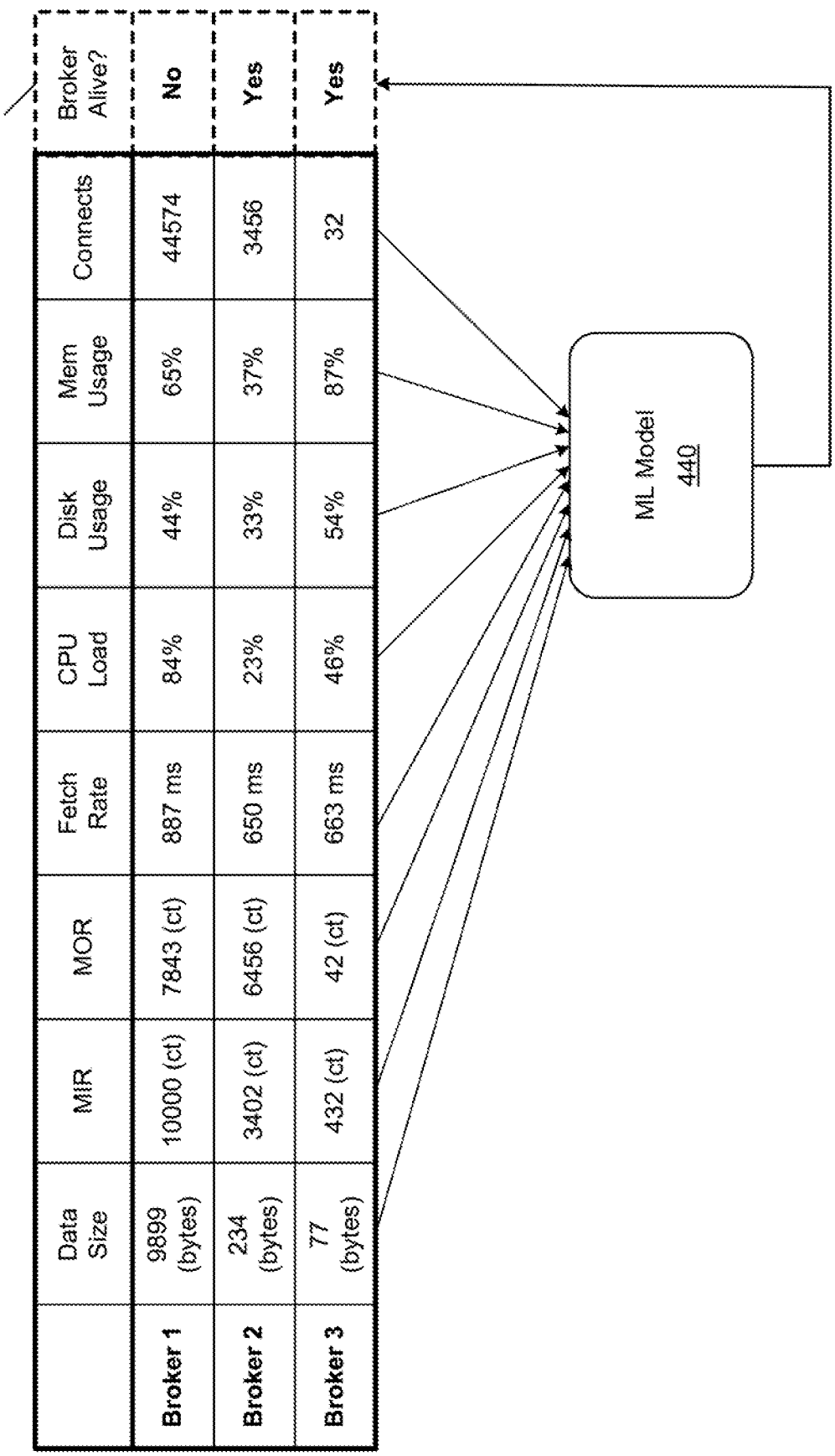
FIG. 4B is a diagram illustrating a process of training a machine-learning model to identify a health of a broker according to example embodiments.

In this example, the coordinator 420 may monitor communication channels, processing cores, memory usage, read/write communications, and the like, of each of the brokers 411, 412, and 413, and determine various workload attributes of each of the brokers. An example of the workload attributes that can be identified are shown in FIG. 4B. This is not an exhaustive list and is just meant for purposes of example.

In some embodiments, the host platform may develop/train a machine learning model such as the machine learning model 440 shown in FIG. 4B. For example, the host platform may collect historical performance/workload data from each of a plurality of brokers in a common cluster and generate/train a machine learning model based on the historical workload data. The training process may cause the model to apply greater weight to some attributes of the workload over others. For example, CPU usage or read/write ratio may be the most heavily weighted attribute while links may be the least weighted, as just one example. The resulting model may then be used to evaluate the health of a broker.

FIG. 4B illustrates a process 430 of determining a health value of each broker shown in FIG. 4A based on execution of a machine-learning model 440. In this example, the machine learning model 440 is trained based on the historical data of the three brokers 411, 412, and 413 shown in FIG. 4A which trains the model to determine a health value for each of the respective brokers. A health value may be a numerical output generated by the machine learning model 440 based on input workload attributes (which are encoded or otherwise vectorized before input to the machine learning model 440). As an example, the coordinator 420 shown in FIG. 4A may capture the workload attributes, convert them, and input them to the machine learning model 440 during execution.

In the example of FIG. 4B, the model outputs a score/value between 0.0 and 1.0. The host platform may compare the output value to a threshold value which may be established by default or by the user via an input mechanism on a user interface of the host platform, etc. In this example, the threshold value is 0.75. If the health value is at or above 0.75, the host platform determines the broker is healthy. If the health value is below 0.75, the host platform determines the broker is unhealth (not alive) and a new lead broker may be necessary. Here, the host platform may create a new column 442 within the workload data that includes the health indicator (alive or not, etc.) The threshold for healthy and unhealthy can be adjusted dynamically by a user via a user interface, etc.

Figure 4C:
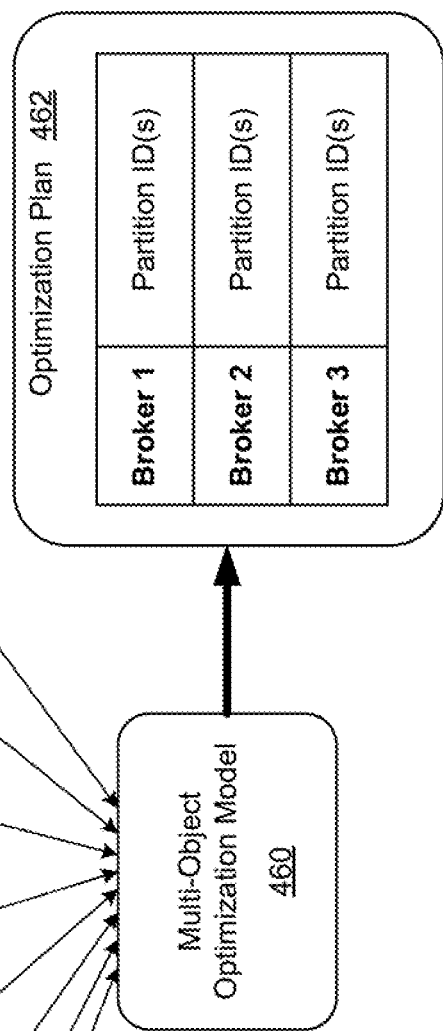
FIG. 4C is a diagram illustrating a process of optimizing a workload amongst the cluster of brokers according to example embodiments.

FIG. 4C illustrates a process 450 of optimizing a workload amongst the cluster of brokers according to example embodiments. Referring to FIG. 4C, when an unhealthy broker is detected, all of the brokers from that cluster can be added to a list and a multi-objective optimization model 460 with a multi-objective optimization algorithm can be executed to identify an optimal assignment of lead roles amongst the brokers in the cluster. For example, the algorithm may attempt to optimize multiple workload attributes at the same time/overall while adjusting the leader roles amongst the brokers to arrive at a more balanced leadership duties/roles amongst the brokers in the cluster. The optimization plan or leader plan can be used by the host platform to reallocate roles and resources to the brokers. For example, the host platform may change the role of one or more follower brokers to be a leader broker, and vice versa.

FIG. 5 illustrates a method 500 of training a time-series forecasting model according to an example embodiment. For example, the method 500 may be performed by a computer system such as a cloud platform, a web server, a personal computer or other user device, and the like. Referring to FIG. 5, in 510 the method may include monitoring a plurality of brokers within a cluster to identify current workload attributes of the plurality of brokers. In 520, the method may include determining a health value of a lead broker within the cluster via execution of a machine learning model on current workload attributes of the lead broker.

In 530, the method may include determining to modify resources assigned to the lead broker based on the determined health value of the lead broker. In 540, the method may include executing an optimization algorithm on the current workload attributes of the plurality of brokers within the cluster to determine an optimum task distribution. In 540, the method may include reallocating tasks amongst the lead broker and the one or more other brokers within the cluster based on the optimum task distribution.

In some embodiments, the monitoring may include monitoring one or more of CPU usage, byte-in rate, byte-out rate, fetch request rate, bytes written, and bytes read by each of the plurality of brokers. In some embodiments, the method may further include retrieving historical workload attributes of the plurality of brokers within the cluster and training the machine learning model based on the historical workload attributes of the plurality of brokers. In some embodiments, the training may include training the machine learning model to identify a key workload attribute among a plurality of workload attributes within the historical workload attributes.

In some embodiments, the executing may include determining an optimal leader plan for the plurality of brokers in the cluster for a plurality of partitions of a computing system based on the execution of the optimization algorithm. In some embodiments, the method may further include displaying a user interface comprising input mechanisms for modifying parameters of a machine learning algorithm included in the machine learning model. In some embodiments, the method may further include receiving inputs via the user interface and modifying the parameters of the machine learning algorithm included in the machine learning model prior to determining the health value of the lead broker. In some embodiments, the reallocating may include reassigning a lead role of the lead broker with respect to a partition to another broker in the cluster.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
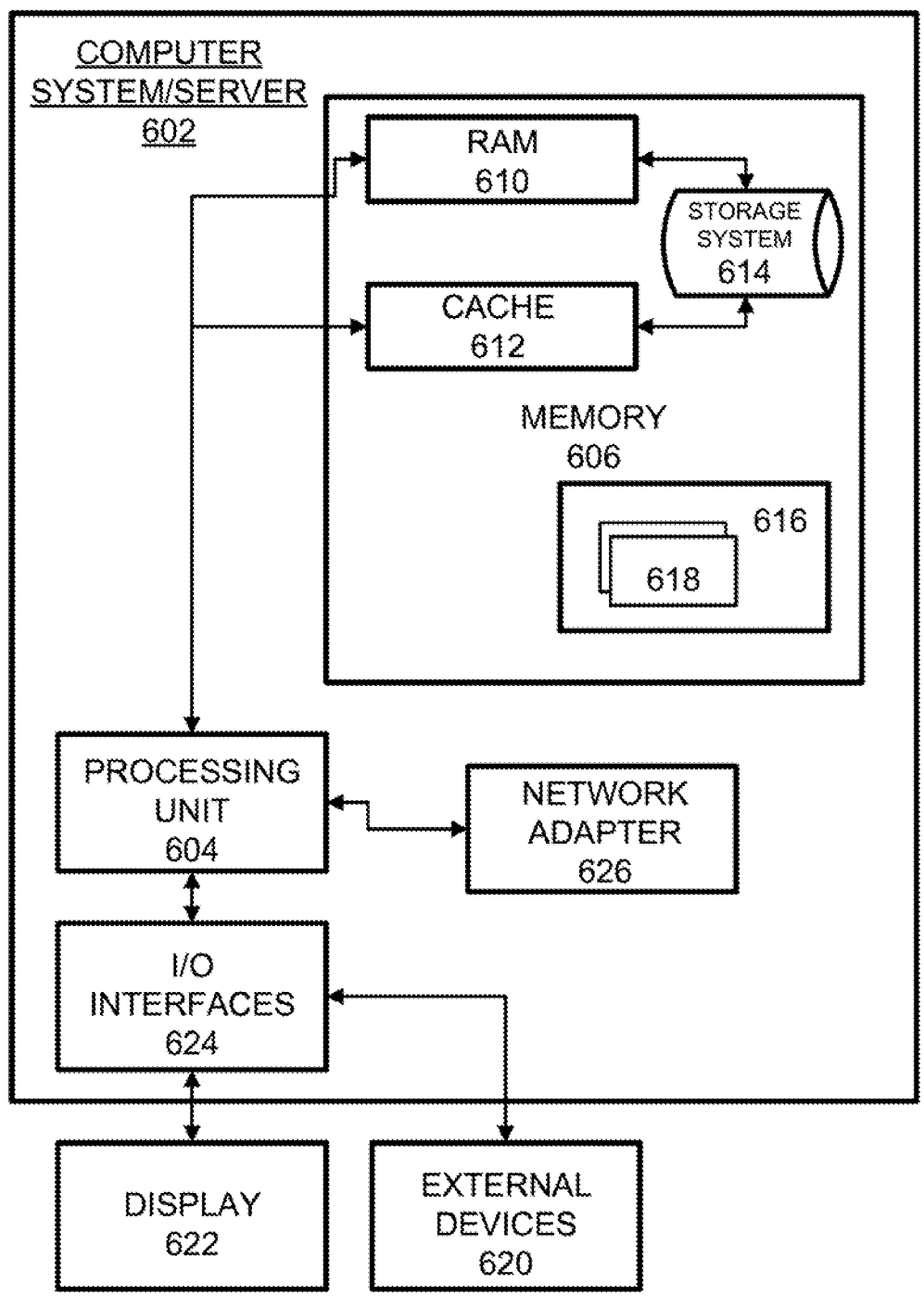
FIG. 6 is a diagram illustrating an example of a computing system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive").

Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
a processor configured to monitor a plurality of brokers within a cluster to identify current workload attributes of the plurality of brokers; and
a storage configured to store the current workload attributes,
wherein the processor is further configured to:
receive, via a user interface, parameters for a machine learning model;
modify current parameters of the machine learning model based on the parameters,
after the current parameters are modified, determine a health value of a lead broker, of the plurality of brokers, via an execution of the machine learning model using current workload attributes of the lead broker,
in response to the health value being below a threshold value, execute an optimization algorithm on the current workload attributes of the plurality of brokers within the cluster to determine an optimum task distribution and to modify resources assigned to the lead broker, and
reallocate tasks amongst the lead broker and one or more other brokers, of the plurality of brokers, within the cluster based on the optimum task distribution.

2. The apparatus of claim 1, wherein the processor is configured to monitor one or more of:
CPU usage, byte-in rate, byte-out rate, fetch request rate, bytes written, and bytes read by each of the plurality of brokers.

3. The apparatus of claim 1, wherein the processor is configured to:
retrieve historical workload attributes of the plurality of brokers within the cluster, and
train the machine learning model based on the historical workload attributes of the plurality of brokers.

4. The apparatus of claim 3, wherein, when the processor trains the machine learning model based on the historical workload attributes, the processor is further configured to:
train the machine learning model to identify a key workload attribute from among the historical workload attributes.

5. The apparatus of claim 1, wherein the processor is configured to:
create an optimal leader plan for the plurality of brokers for a plurality of partitions of a computing system based on the execution of the optimization algorithm.

6. The apparatus of claim 1, wherein, when the processor reallocates tasks, the processor is further configured to:
re-assign a lead role of the lead broker with respect to a partition to another broker in the cluster.

7. A method comprising:
monitoring a plurality of brokers within a cluster to identify current workload attributes of the plurality of brokers;
receiving, via a user interface, parameters for a machine learning model;
modifying current parameters of the machine learning model based on the parameters;
after the current parameters are modified, determining a health value of a lead broker, of the plurality of brokers, via an execution of the machine learning model using current workload attributes of the lead broker;
in response to the health value being below a threshold value, executing an optimization algorithm on the current workload attributes of the plurality of brokers within the cluster to determine an optimum task distribution and to modify resources assigned to the lead broker; and
reallocating tasks amongst the lead broker and one or more other brokers, of the plurality of brokers, within the cluster based on the optimum task distribution.

8. The method of claim 7, wherein the monitoring further comprises:
monitoring one or more of CPU usage, byte-in rate, byte-out rate, fetch request rate, bytes written, and bytes read by each of the plurality of brokers.

9. The method of claim 7, wherein the method further comprises:
retrieving historical workload attributes of the plurality of brokers within the cluster; and
training the machine learning model based on the historical workload attributes of the plurality of brokers.

10. The method of claim 9, wherein the training further comprises:
training the machine learning model to identify a key workload attribute from among the historical workload attributes.

11. The method of claim 7, wherein the executing further comprises:
creating an optimal leader plan for the plurality of brokers for a plurality of partitions of a computing system based on the execution of the optimization algorithm.

12. The method of claim 7, wherein the reallocating further comprises:
reassigning a lead role of the lead broker with respect to a partition to another broker in the cluster.

13. A computer-readable storage medium comprising instructions that when executed by a processor cause the processor to perform:
monitoring a plurality of brokers within a cluster to identify current workload attributes of the plurality of brokers;
receiving, via a user interface, parameters for a machine learning model;
modifying current parameters of the machine learning model based on the parameters;
after the current parameters are modified, determining a health value of a lead broker, of the plurality of brokers, via an execution of the machine learning model using current workload attributes of the lead broker;
in response to the health value being below a threshold value, executing an optimization algorithm on the current workload attributes of the plurality of brokers within the cluster to determine an optimum task distribution and to modify resources assigned to the lead broker; and reallocating tasks amongst the lead broker and one or more other brokers, of the plurality of brokers, within the cluster based on the optimum task distribution.

14. The computer-readable storage medium of claim 13, wherein the monitoring further comprises:

monitoring one or more of CPU usage, byte-in rate, byte-out rate, fetch request rate, bytes written, and bytes read by each of the plurality of brokers.

15. The computer-readable storage medium of claim 13, wherein the method further comprises:

retrieving historical workload attributes of the plurality of brokers within the cluster; and training the machine learning model based on the historical workload attributes of the plurality of brokers.

16. The computer-readable storage medium of claim 15, wherein the training further comprises:

training the machine learning model to identify a key workload attribute from among the historical workload attributes.

\* \* \* \* \*